United States Patent
Chen et al.

(10) Patent No.: US 9,652,425 B2
(45) Date of Patent: May 16, 2017

(54) METHOD, APPARATUS AND SYSTEM FOR A SOURCE-SYNCHRONOUS CIRCUIT-SWITCHED NETWORK ON A CHIP (NOC)

(71) Applicant: Intel Corporation, Santa Clara, CA (US)

(72) Inventors: Gregory K. Chen, Hillsboro, OR (US); Mark A. Anders, Hillsboro, OR (US); Himanshu Kaul, Portland, OR (US); Sudhir K. Satpathy, Hillsboro, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/126,910

(22) PCT Filed: Jun. 28, 2013

(86) PCT No.: PCT/US2013/048748
§ 371 (c)(1),
(2) Date: Dec. 17, 2013

(87) PCT Pub. No.: WO2014/209391
PCT Pub. Date: Dec. 31, 2014

(65) Prior Publication Data
US 2015/0220470 A1 Aug. 6, 2015

(51) Int. Cl.
*G06F 13/42* (2006.01)
*G06F 13/40* (2006.01)
*H04L 12/933* (2013.01)

(52) U.S. Cl.
CPC ...... *G06F 13/4022* (2013.01); *G06F 13/4282* (2013.01); *H04L 49/109* (2013.01)

(58) Field of Classification Search
CPC .................. G06F 13/4282; G06F 13/4022
USPC ........................................... 710/105
See application file for complete search history.

(56) References Cited

U.S. PATENT DOCUMENTS

| | | |
|---|---|---|
| 8,064,341 B2 | 11/2011 | Beshai |
| 2006/0209846 A1 | 9/2006 | Clermidy et al. |
| 2007/0217439 A1 | 9/2007 | Lemaire et al. |
| 2008/0005402 A1 | 1/2008 | Kim et al. |
| 2010/0262973 A1* | 10/2010 | Ernst .............. G06F 9/5011 718/104 |
| 2011/0064087 A1 | 3/2011 | Lan et al. |

(Continued)

FOREIGN PATENT DOCUMENTS

| | | |
|---|---|---|
| EP | 1863232 | 12/2007 |
| KR | 1020050115195 | 12/2005 |

OTHER PUBLICATIONS

Hongyin Luo et al., "Hybrid Circuit-Switched NoC for Low Cost On-Chip Communication", Aug. 24-26, 2012, pp. 180-184.*

(Continued)

*Primary Examiner* — Chun-Kuan Lee
(74) *Attorney, Agent, or Firm* — Trop, Pruner & Hu, P.C.

(57) ABSTRACT

In an embodiment, a router includes multiple input ports and output ports, where the router is of a source-synchronous hybrid network on chip (NoC) to enable communication between routers of the NoC based on transitions in control flow signals communicated between the routers. Other embodiments are described and claimed.

7 Claims, 12 Drawing Sheets

(56) References Cited

U.S. PATENT DOCUMENTS

2011/0067114 A1  3/2011  Weber et al.
2011/0320854 A1* 12/2011  Elrabaa .................... G06F 5/14
                                                                 713/600

OTHER PUBLICATIONS

International Searching Authority, "Notification of Transmittal of the International Search Report and the Written Opinion of the International Searching Authority," mailed Mar. 31, 2014, in International application No. PCT/US2013/048748.
Hsin-Chou Chi, et al., "A Switch Supporting Circuit and Packet Switching for On-Chip Networks," Apr. 18-21, 2006, pp. 224-225.
Korea Intellectual Property Office, Notice of Preliminary Rejection mailed Nov. 11, 2016, in Korean Patent Application No. 2015-7033826. (Redacted).
Teehan, et al, "A Survey and Taxonomy of GALS Design Styles", IEEE Design and Test of Computers, IEEE Service Center, New York, NY, US, vol. 24, No. 5, Sep. 1, 2007, pp. 418-428, XP011193403, ISSN: 0740-7475, DOI: 10.1109/MDT.2007.151 * figure 5 * * pp. 422-425 *.
Rostislav, et al, "An Asynchronous Router for Multiple Service Levels Networks on Chip", Asynchronous Circuits And Systems, 2005, ASYNC 2005, Proceedings, 11th IEEE International Symposium On New York City, NY, USA, Mar. 14-16, 2005, Piscataway, NJ, USA, IEEE, Mar. 14, 2005, pp. 44-53, XP010777860, DOI: 10.1109/ASYNC.2005.11 ISBN: 978-0-7695-2305-7 * figure 13 * * figure 2 * * Section 3 *.
European Patent Office, Extended European Search Report mailed Feb. 10, 2017 in European Patent Application No. 13888327.7.

* cited by examiner

METHOD, APPARATUS AND SYSTEM FOR A SOURCE-SYNCHRONOUS CIRCUIT-SWITCHED NETWORK ON A CHIP (NOC)

This invention was made with Government support under contract number HR0011-10-3-0007 awarded by the Department of Defense. The Government has certain rights in this invention.

TECHNICAL FIELD

This disclosure pertains to computing systems, and in particular (but not exclusively) to communicating information via a network.

DETAILED DESCRIPTION

Figure 1:
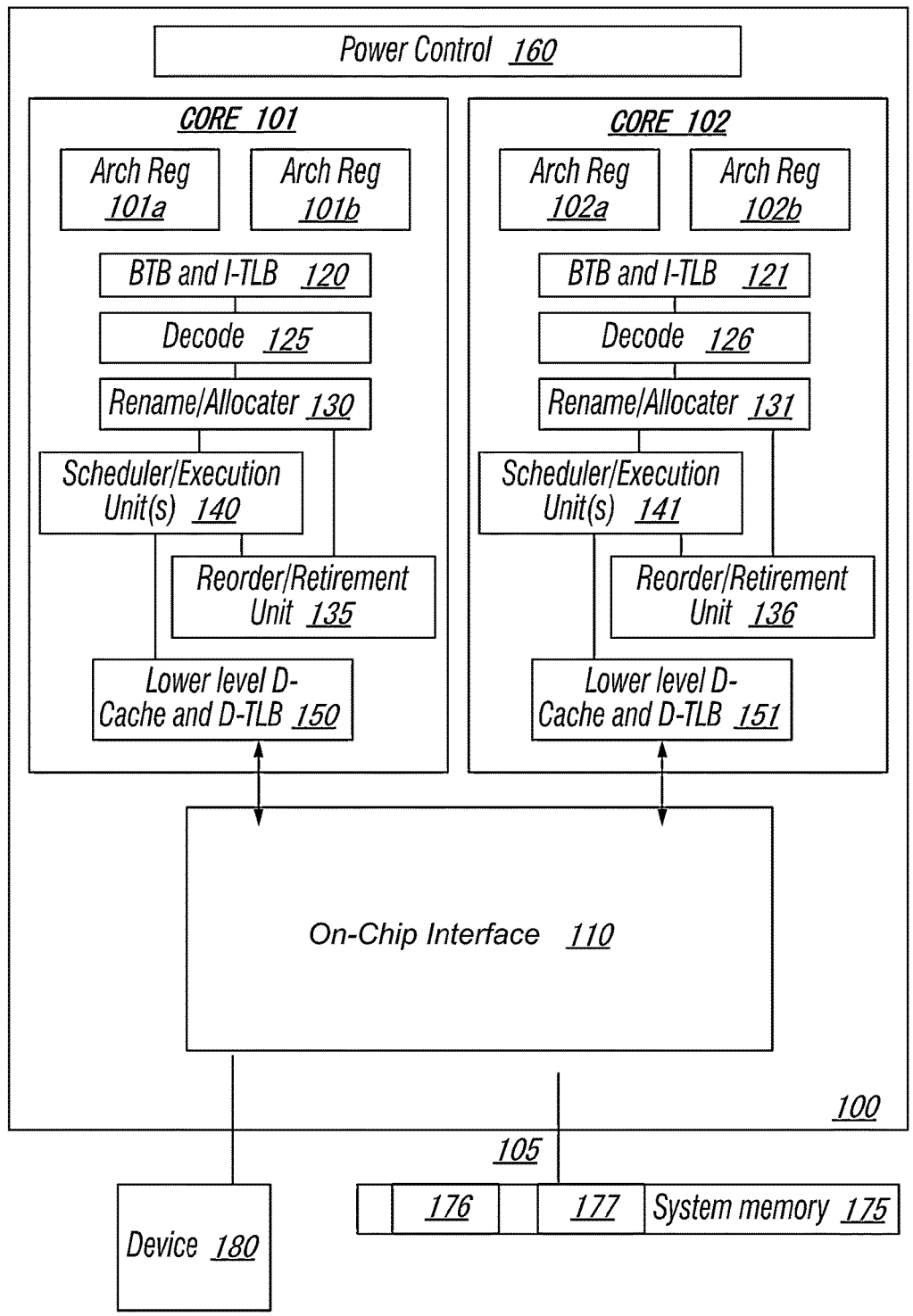
FIG. 1 is a block diagram of a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning.

Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

On-chip communication among an increasing number of integrated intellectual property (IP) logics creates a greater impact on processor power and performance. A network on a chip (NoC) is one of the most widely used fabric topologies currently used in multi-core systems. NoCs send data from source to destination through a shared interconnect constituted of routers connected with links. Conventional synchronous packet-switched NoCs are built from routers that communicate with their neighbors based on a global clock. Packet switching refers to flopping/storing data at least in each router. Thus all the routers in the NoC operate at the same frequency. Furthermore, at low traffic rates, clock power tends to dominate total NoC power consumption, thereby limiting system efficiency.

Source-synchronous NoCs send a delay-matched clock along with each data transfer, eliminating the need for a fully-synchronous clock. This technique facilitates multi-clock designs by removing the need for synchronizing first-in first-out data registers (FIFOs) at each router. Furthermore, throughput increases by incurring delay for only exercised paths, instead of the worst-case paths. Process variation is also mitigated by averaging out timing variations, instead of applying worst-case margins as in a fully-synchronous design. It also eliminates margins for clock skew and jitter. However, source-synchronous NoCs that use packet switching consume clock power to flop the data and control signals at least once at each router. Source-synchronous operation and packet switching are independent of each other. With a source-synchronous hybrid NoC benefits in terms of lower clock power exist because flops are clocked only when there is an actual data being transmitted. Secondly, a source-synchronous hybrid NoC becomes more variation tolerant because by not being limited by the slowest link component, circuits can operate without worst case timing margins.

With the ability to operate at independent supply voltages and speeds, a router in accordance with an embodiment of the present invention provides opportunity for improving energy efficiency in situations where a fabric or traffic pattern is asymmetric in nature.

In various embodiments, a hybrid NoC is provided having a source-synchronous design. In a hybrid NoC a packet-switched reservation packet is used to establish a circuit-switched data channel. In an embodiment the packet-switched reservation packet may be relatively small and the circuit-switched data transfer relatively large. Packets are flopped at least once (and commonly four times) at each router node. In contrast, circuit-switched transfers have no intra-route storage, reducing clock power. In this way the NoC enables hybrid packet and circuit-switched data communication to occur with increased energy efficiency and throughput over fully synchronous or packet-switched NoCs. By transmitting the majority of data on a circuit-switched channel, intervening storage elements can be avoided, reducing power consumption. And by using the hybrid design, a packet-switched network can be used to reserve a path of the circuit-switched network, mitigating congestion from contention for network resources.

Embodiments may be especially suited for NoCs with IP blocks operating in different clock and voltage domains as well as heterogeneous NoCs. As such, embodiments combine the benefits of source-synchronous operation and circuit switching to ease integration and reduce clock and arbitration power.

Hybrid NoCs thus combine the throughput of packet-switched networks with the energy efficiency of circuit-switched data channels. Using a source synchronous arrangement, a processor such as a system on a chip (SoC) including the NoC may be designed with multiple clock domains. Source synchronous operation facilitates integration of heterogeneous NoCs with numerous clock domains without global clock distribution or synchronizing data FIFO buffers in each router. As such, network performance is prevented from being globally limited by slow paths or routers and throughput increases by averaging process variation-induced timing variations and eliminates margining for clock skew and jitter.

In various embodiments, source-synchronous clocking allows individual routers to communicate in the absence of any global synchronizing signal. Instead, transitions in control flow signals are used to convey information, thereby obviating the need for a global clock signal. Routers communicate with their neighbors using control flow signals (e.g., "Request" and "Grant" signals). However, instead of being level sensitive, they are transition encoded. A transition on "Request" indicates the presence of a new packet at the router's input port. A transition on "Grant" indicates that the previous data at the router's output port has been processed and new data can be launched.

Figure 2:
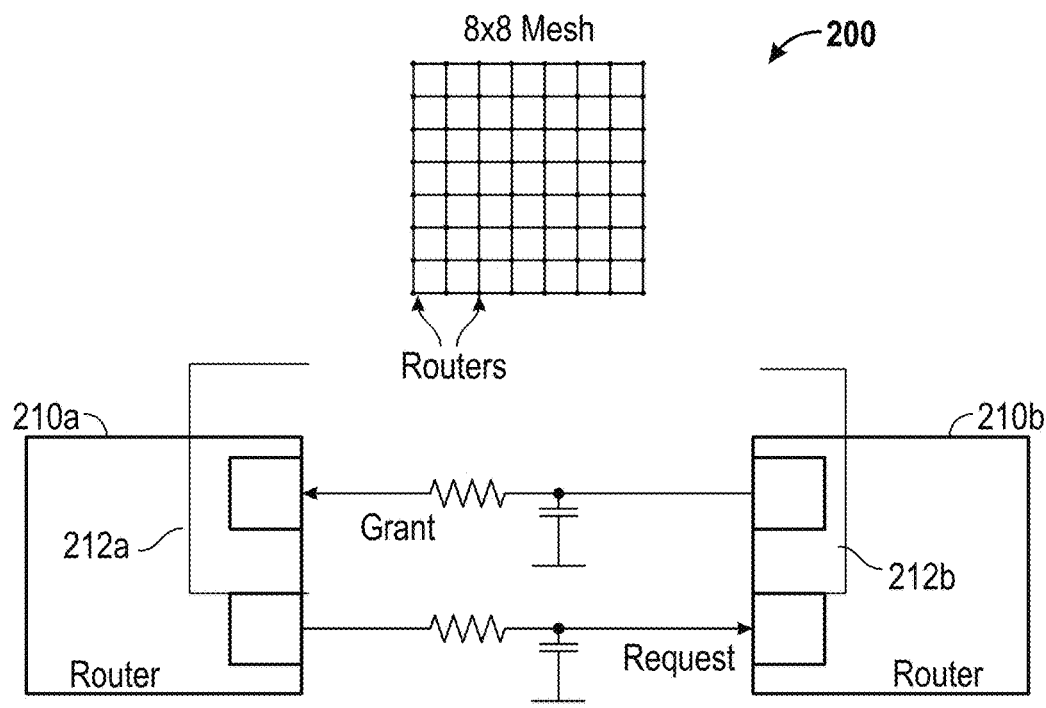
FIG. 2 is a block diagram of a NoC in accordance with an embodiment of the present invention

Referring now to FIG. 2, shown is a block diagram of a NoC 200 in accordance with an embodiment of the present invention, as well as further details of a pair of connected routers 210a and 210b. As seen, router 210a includes an output port 212a and router 210b includes an input port 212b. The corresponding output port transmits a "Request" signal communicated to corresponding input port 212b of router 210b. In turn this input router communicates a "Grant" signal back to router 210a. As shown in FIG. 2, when "Request" transitions, the latch at the input port of a router closes and sends a request to the appropriate output port. When this request is serviced, the input port sends a grant back to the output port. This opens the latch, thereby allowing a new packet to enter the input port. Note that another pair of request/grant signals may be communicated in the other direction for data that flows from router 210b to router 210a.

In one embodiment, a router launches a packet by toggling the "Request" signal and waiting for the "Grant" to be received back from the neighboring router over the interconnect as shown in FIG. 2. To avoid this additional latency for the returning "Grant" signal, some embodiments allow the source to launch multiple packets before the grant for the very first packet is received. In this credit-based system, multiple packets in flight are held by intermediate storage buffers (e.g., latches). While described herein as a credit-2 system in which 2 packets can be launched by a router before it receives any grant, other credit schemes are possible. Depending upon the distance between different ports within a router from their destination IPs, each port can be made to operate at independent credit levels as well. This independence is particularly useful for SoC integration where, depending on the size of different IPs and their floorplans, some IPs may be further apart from a router than other IPs.

Figure 3:
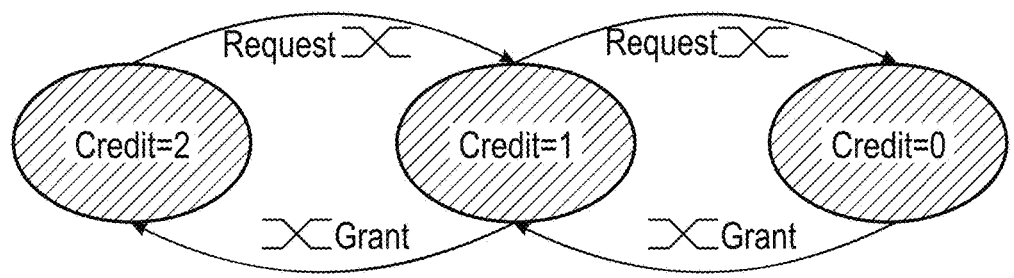
FIG. 3 is a state diagram of credit tracking for flow control in accordance with an embodiment of the present invention.

In one embodiment, a router operating in a credit-2 mode can launch 2 packets of data by toggling "Request" twice before receiving an acknowledgement by way of a corresponding "Grant" signal. The state diagram for credit tracking for such flow control is shown in FIG. 3. As seen in FIG. 3, the system may begin in a credit-2 state. On a transition of a "Request" signal, the state machine moves to a credit state of 1 and upon another "Request" transition it moves to a credit state of 0. In turn, transitions in the "Grant" signal cause transitions of the state machine into increasing credit states 1 and 2 as shown.

Figure 4:
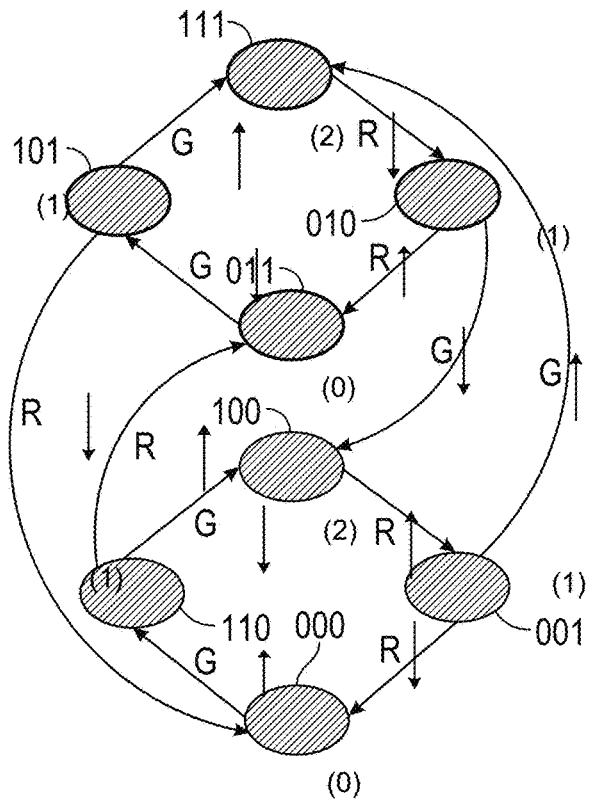
FIG. 4 is a block diagram of a finite state machine in accordance with an embodiment of the present invention.

Referring now to FIG. 4, shown is a block diagram of a finite state machine (FSM) in accordance with an embodiment of the present invention. A finite state machine toggles among 8 possible states denoting 3 possible levels of credit based on the transitioning of request and grant. To avoid credit tracking errors due to simultaneous transitions of request and grant, the 3 credit states are split into 8 finite state machine states. As annotated on FIG. 4, credit 0 has 2 FSM states, credit 1 has 4 FSM states, and credit 2 has 2 FSM states. As a result of mapping the credit states to 8 FSM states, the transitions through the finite state machine are set by request/grant signal levels, instead of transitions. The system starts with a credit level of 2 with request and grant signals both high. Changes from the high to low level are shown by arrows pointing downwards and changes from the low to high level are shown by arrows pointing upwards. The credit counts at each state are also shown in FIG. 4.

Figure 5:
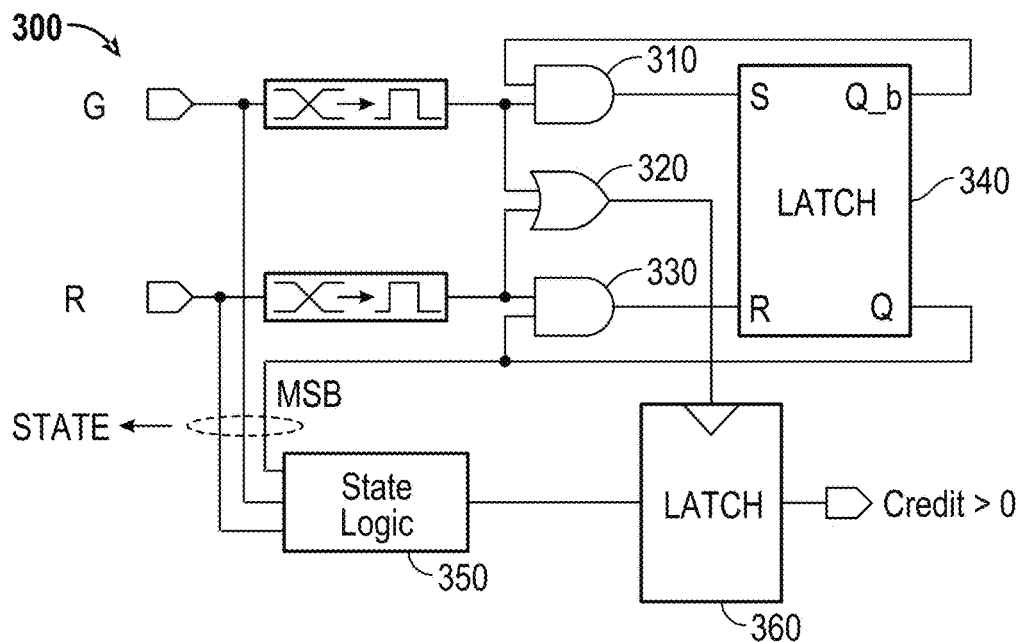
FIG. 5 is a block diagram of a credit tracking circuit in accordance with an embodiment of the present invention.

Referring now to FIG. 5, shown is a block diagram of a credit tracking circuit in accordance with an embodiment of the present invention. As seen in FIG. 5, credit tracking circuit 300 receives the "Grant" and "Request" signals via a set of logic gates 310, 320 and 330. In turn, the output of AND gates 310 and 330 drive the set and reset inputs of a latch 340, the output of which corresponds to a most significant bit (MSB). The state of the three signals is input via a logic 350 to latch 360 that is clocked by the output of OR gate 320 to thus indicate a credit level. More specifically, the output of latch 360 is high when the credit level is neither 000 nor 011. Note that request and grant transitions are converted to pulses before entering logic gates 310, 320, and 330.

Thus as seen in FIG. 5, at any given instant, the credit tracking state machine is responsive to either a transition in "Request," "Grant," or both. For simultaneous transitions in "Request" and "Grant", the state machine attains the correct state irrespective of the order in which it responds to "Request" and "Grant". The state machine produces a single bit output, which if high indicates that a packet can be launched by the router port. Furthermore, given a situation where both "Request" and "Grant" transition simultaneously the unique nature of the state assignment ensures that the correct state is always attained irrespective of the order in which the transitions are handled.

Figure 6:
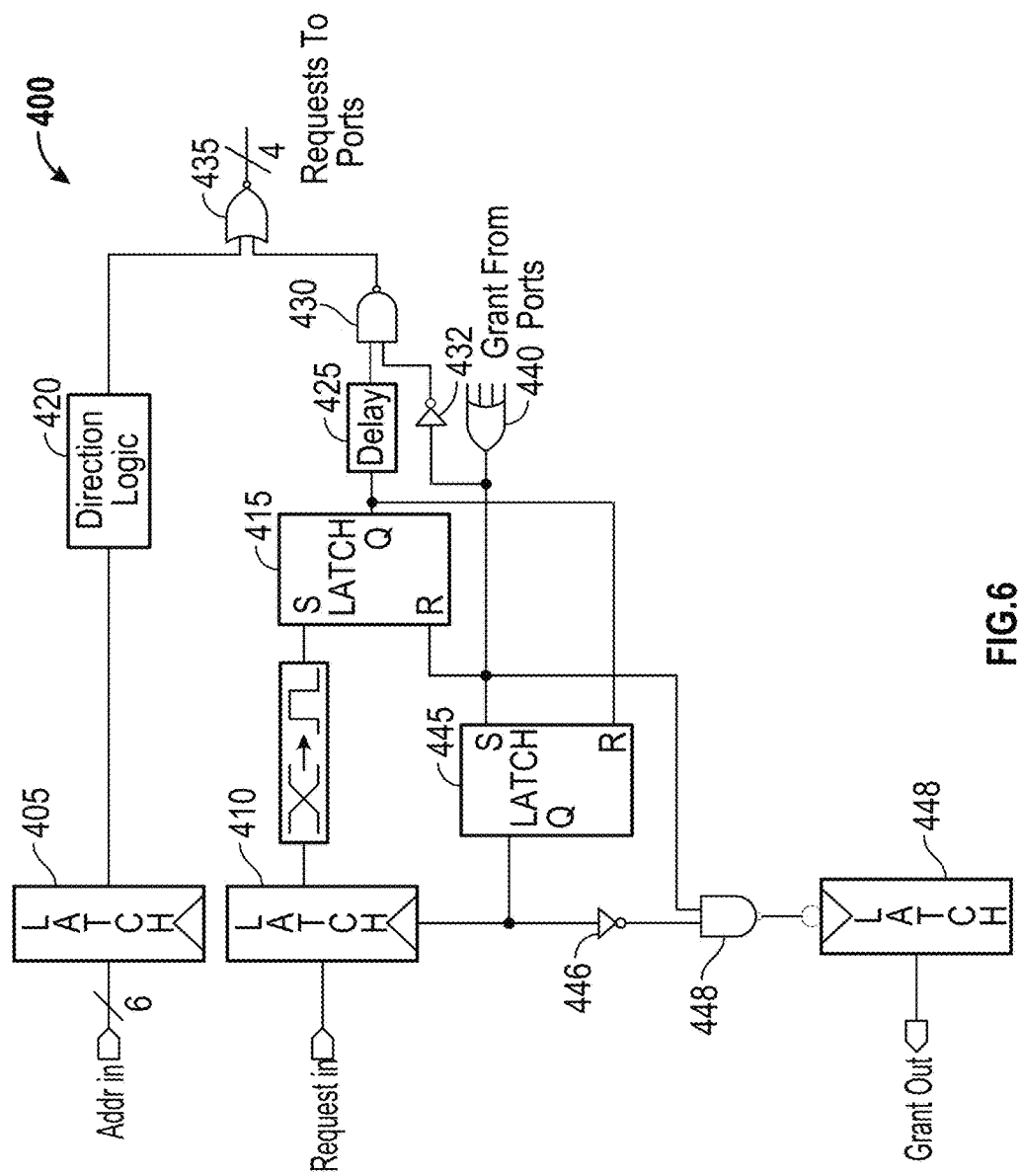
FIG. 6 is a block diagram of a packet router input port in accordance with an embodiment of the present invention.

Referring now to FIG. 6, shown is a block diagram of a packet router input port in accordance with an embodiment of the present invention. As seen in FIG. 6, input port 400 includes input latches 405 and 410 to respectively receive an address and the request signal. The address is provided to a direction logic 420 that generates a one hot bit-vector output to a NOR gate 435. In turn, the request input is latched through latch 410 (and pulse conversion logic) to another latch 415 that in turn drives a delay element 425 having an output coupled to a NAND gate 430, the output of which is coupled to NOR gate 435. Note that the second input to NAND gate 430 is received via an output of an inverter 432 that in turn is coupled to an output of an OR gate 440 which receives a set of grant signals from the various ports. This output signal also drives another latch 445 that is used to clock both input latch 410 and an output latch 448, which drives the grant output. Note that the clock signal for latch 448 is driven through an inverter 446 and a NAND gate 448.

Figure 7:
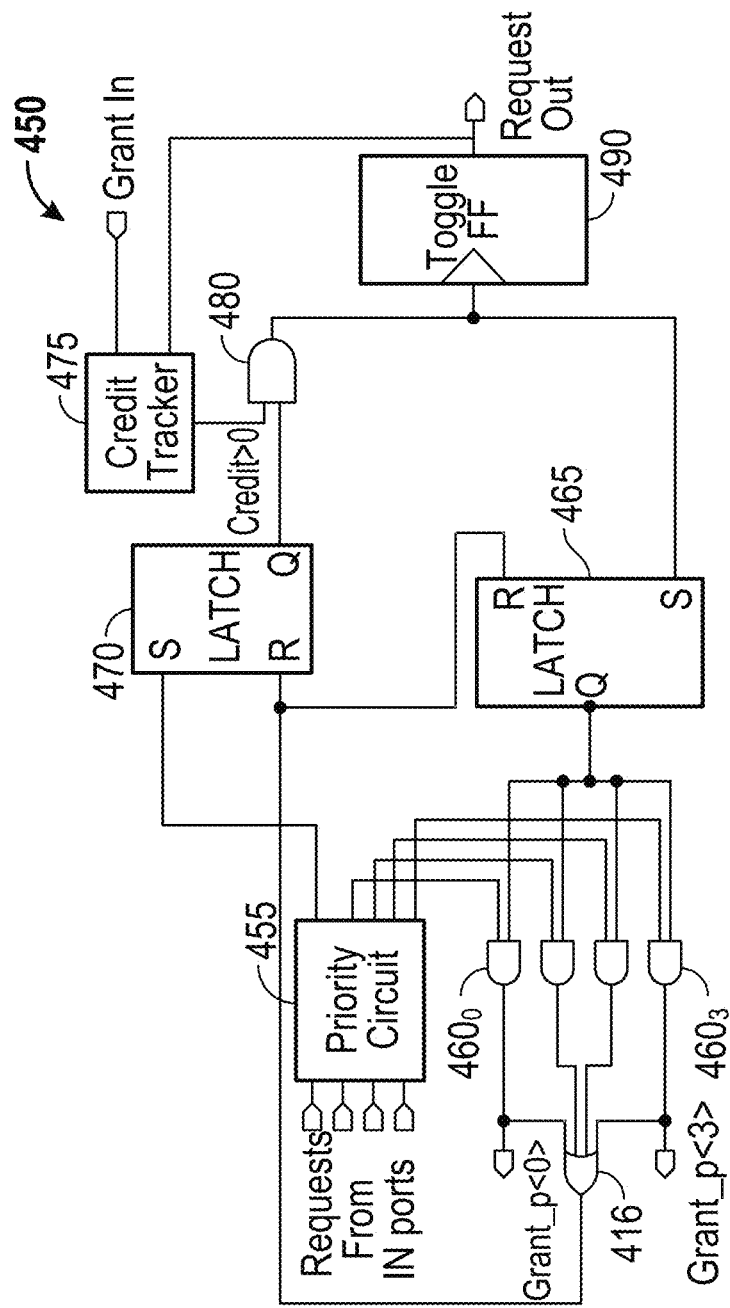
FIG. 7 is a block diagram of a packet router output port in accordance with an embodiment of the present invention.

FIG. 7 is a block diagram of a packet router output port in accordance with an embodiment of the present invention. With reference now to FIG. 7, router output port 450 includes a priority circuit 455 that receives requests from the various input and outputs signals to a set of AND gates $460_0$-$460_3$, the outputs of which drive an OR gate 461. The other inputs to AND gates 460 are received via a latch 465 driven by an AND gate 480, which receives a high signal from credit tracker 475 when the amount of credits is greater than zero. This AND gate further clocks a toggle flip-flop 490, which provides a request output signal. Note the other input to AND gate 480 is via another latch 470 coupled to an output having set and reset inputs received from priority circuit 455 and OR gate 461, respectively.

The input and output ports of the router are designed to work in conjunction with the credit tracking logic. In the absence of a packet, the input latch stays transparent. A transition in the request signal causes an internal level sensitive request to be created and propagated to the appropriate output port using a one hot bit-vector generated by direction logic 420. After processing the level sensitive request, the output port sends a grant signal to the input port to close input latch 410. The internal request is propagated to the appropriate output port using a one hot bit-vector generated by direction logic 420.

As seen in FIG. 7, priority circuit 455 selects one among the incoming level sensitive request signals from the input port. If the 'credit>0' bit output by credit tracker 475 is high, the "request out" signal is toggled. This implies launch of a new packet. Simultaneously, a grant is sent back to the corresponding input port. In response to this grant, the input port de-asserts its request by resetting its internal request signal and toggles its "grant out" port to the preceding router to indicate a successful transfer of the packet. Simultaneously, input port 400 opens input latch 410, thereby allowing a new packet to enter the router.

Circuit-switched data decreases energy consumption by eliminating intra-route data flip-flops and their clock power. The combination of source synchronous operation and circuit-switched data provides further benefits. For fully-synchronous operation, the clock for circuit transfers is margined for the worst-case corner-to-corner network traversal. Without source-synchronous techniques, neighboring IP blocks have the same circuit-switched latency as two IP blocks on opposite ends of the NoC. With source-synchronous operation, circuit-switched activity is event based relative to the IP-to-IP delay, resulting in a 65% latency reduction in a 16×16 mesh with random traffic, as an example. Using circuit-switching in conjunction with near-threshold voltage operation approaches the limit of energy-efficiency with a complementary metal oxide semiconductor (CMOS) design, defined by point-to-point interconnect containing only wires and combinational repeaters running at low voltage. Embodiments may further include demultiplexers (demuxes), multiplexers (muxes), and arbitration circuits to control NoC flow on top of the ideal point-to-point case.

In one hybrid source synchronous NoC implementation, request packets establish circuit-switched channels between source and destination IPs. To begin a data transfer, a source IP sends a reservation packet (e.g., including a 1 bit (b) request, 8b address, and optional packet data, in an embodiment) toward the destination IP. The packet is flopped once per router and forwarded downstream. Each router on the path sends a grant signal (e.g., a 1b grant) back to the previous router to free the upstream link in a credit-based system. In one embodiment, the credit system may be implemented as a credit-2 system, as discussed above. When a circuit-switched channel is established, data is communicated on the channel from source to destination. For this circuit-switched communication, the destination router sends an acknowledge back all the way to the source core once it has received circuit-switched data.

Figure 8:
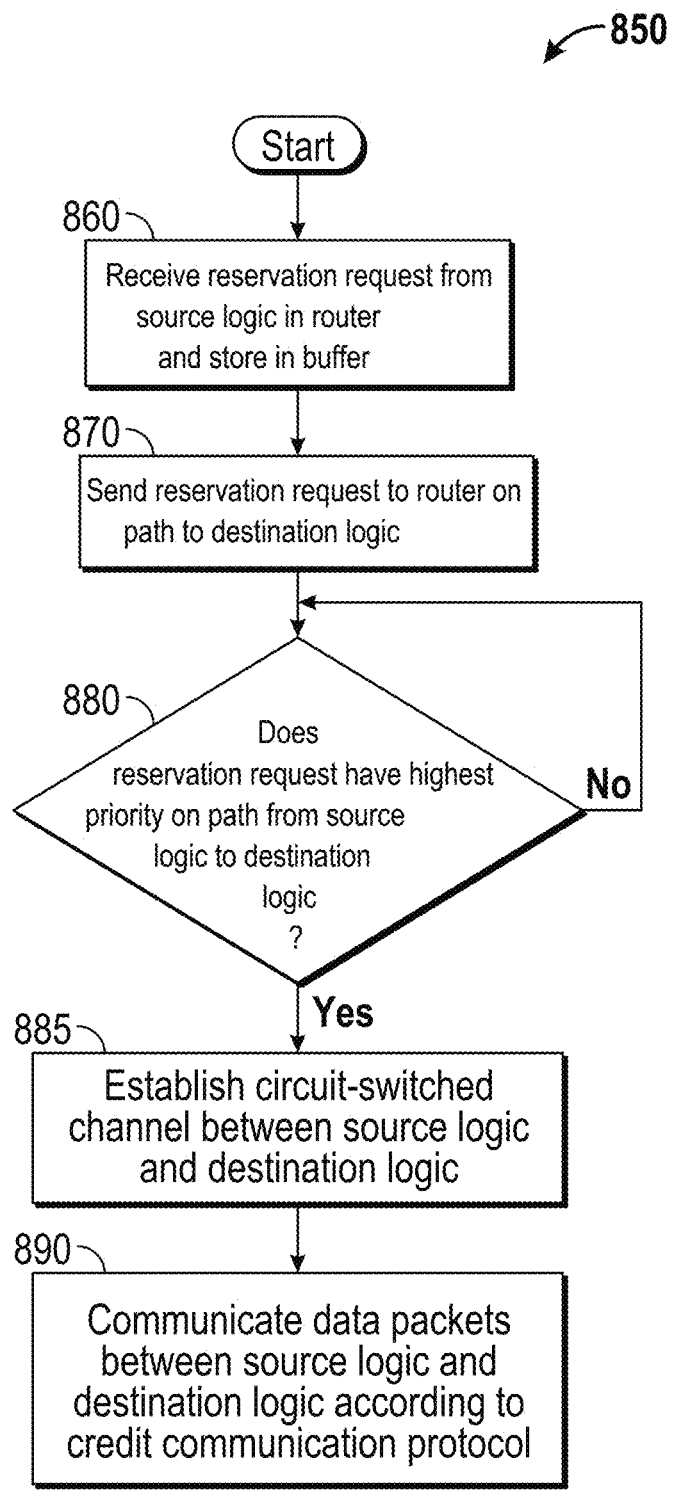
FIG. 8 is a flow diagram of a method in accordance with an embodiment of the present invention.

Referring now to FIG. 8, shown is a flow diagram of a method in accordance with an embodiment of the present invention. As shown in FIG. 8, method 850 may be performed by various logic present throughout a NoC. This logic may be distributed within multiple routers located between a source logic and a destination logic for which a data communication path is desired. As seen, method 850 begins at block 860 where a reservation request is received from the source logic in a router and stored in a buffer (e.g., a FIFO buffer). This reservation request may be a reservation packet communicated via a packet-switched portion of the NoC with or without buffers to store multiple reservation packets, each corresponding to a reservation for data communication between source logic and destination logic. Next at block 870 the reservation packet is sent to a router on a path to the destination logic. For example, based on a lookup or other routing protocol performed in the given router, this reservation packet is forwarded along on a path from the source logic to the destination logic.

Still referring to FIG. 8, next it may be determined whether this reservation request has a highest priority on the path from the source logic to the destination logic (diamond 880). If not, this reservation waits until it is the highest priority. When the reservation has the highest priority, a circuit-switched channel is established between the source logic and the destination logic (block 885). After establishment of this channel, data communication occurs. More specifically at block 890 a circuit-switched data transfer is communicated between the source logic and the destination logic. Each transfer may include one or more segments of data, whose size is set by the data bus. In an embodiment with circuit streaming, multiple segments can be communicated from the source logic to the destination logic before the channel is closed. In an embodiment, communication is performed using 2-phase handshaking with forward (stream, tail) and reverse (ack) handshaking signals. The source logic receives an acknowledgment indicating successful receipt of the each circuit-switched segment transfer communicated. In an embodiment, circuit-switched transfers use a credit-1 system, while packet-switched transfers use a credit-2 system. In a more general sense, both of them can have other independent credit-based protocols. Although described at this high level in the embodiment of FIG. 8, understand the scope of the present invention is not limited in this regard.

Figure 9:
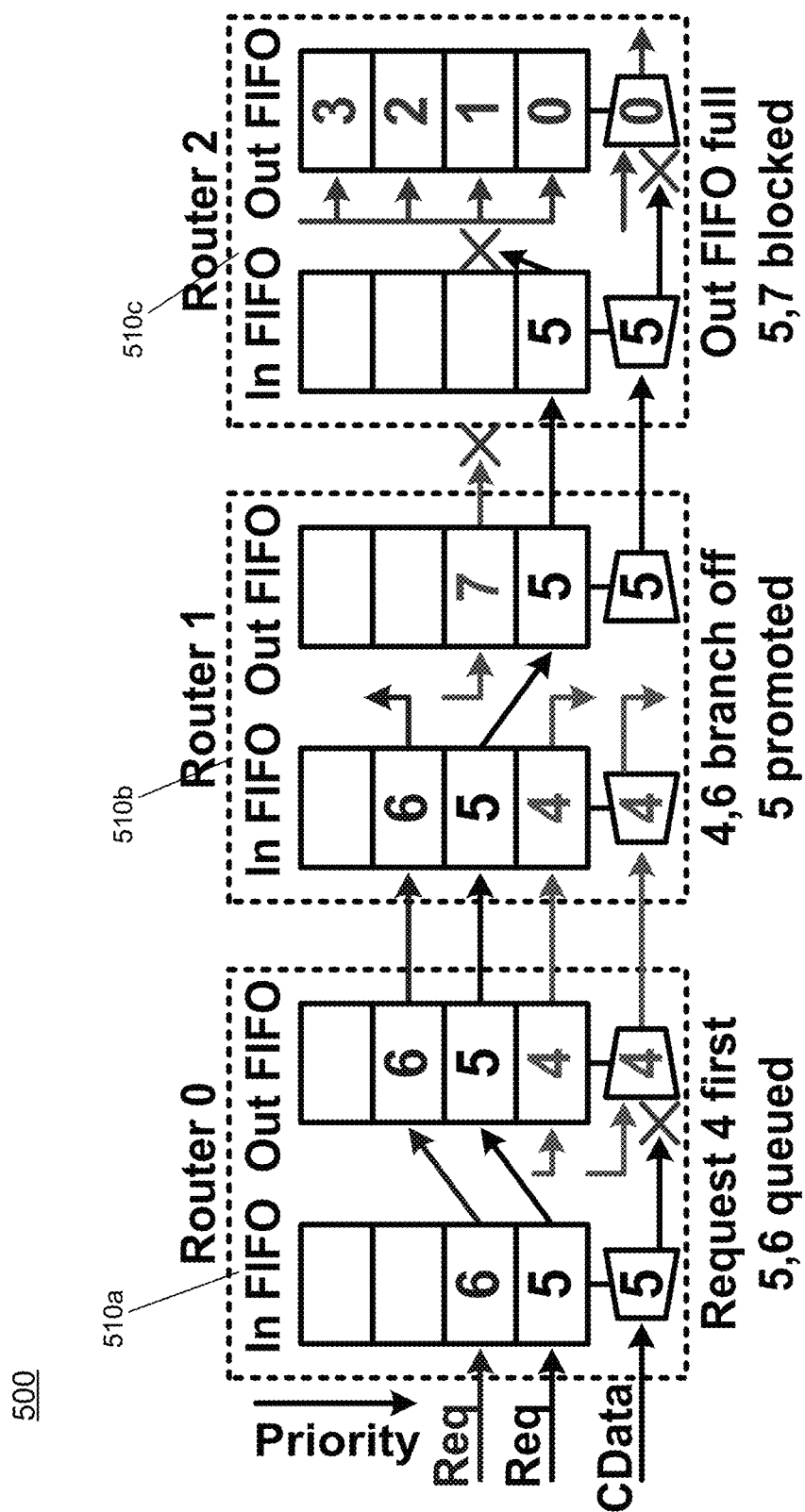
FIG. 9 is a block diagram of a NoC including a plurality of routers in accordance with an embodiment of the present invention.

Referring now to FIG. 9, shown is a block diagram of a NoC 500 including a plurality of routers 510*a*-510*c*. As seen, each input port and output port provide data transfers in an ordered manner. As incoming reservations are enqueued and different reservations are input into different routers, they are branched off at different routers. Thus as seen, within router 510*a*, an earlier reservation is placed ahead of reservations 5 and 6 in the FIFO of the output port. Then in router 510*b*, reservations 4 and 6 are branched off and thus reservation 5 enters the head of the FIFO of this output port. After input into the FIFO of the input port of router 510*c*, reservation 5 is stalled since the FIFO of the output port is full.

At each router port, the reservation stores direction information into the highest available slot in a FIFO. The highest overall slot controls circuit channel multiplexers (muxes) and demultiplexers (demuxes). A reservation may have differing priorities at each set of Out-In ports on the path. That is, reservations may shift slot priority as they traverse a route between source and destination so long as global order is maintained. Reservations are blocked if the FIFO is full. When the reservation has the highest priority in all FIFOs from source to destination, the source and destination IPs communicate using a circuit switching protocol. In an embodiment, this communication includes transfer control signals of a 1b stream signal to indicate a start of a data segment, a 1b tail signal to indicate an end of a data transfer, 80b data and 1b acknowledge on the combinational channel with a 2-phase handshaking protocol. While the channel is held open, circuit data can be streamed to send multiple data segments (e.g., each of 80b of data), with each segment having its own acknowledge. This amortizes circuit-switched arbitration overhead over much larger data transfers. When data streaming is complete, the final acknowledge de-allocates the channel by incrementing the priority in all FIFOs along the path. This removes the completed highest-priority reservation from the FIFO, allowing subsequent circuit-switched transfers to occur.

Figure 10A:
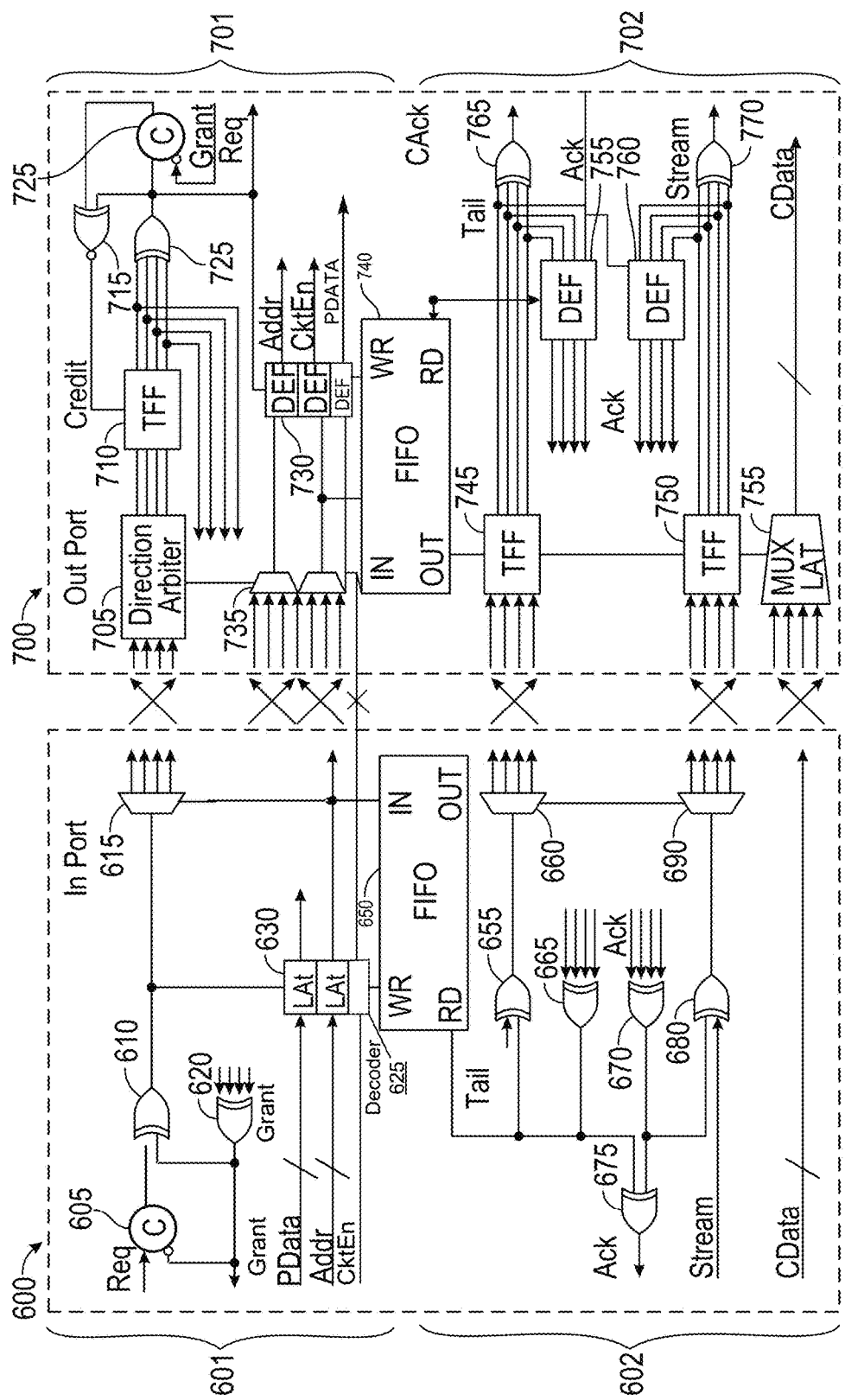
FIGS. 10A-D are block diagrams of details of input and output ports of a router in accordance with one embodiment of the present invention.
Figures 10B, 10C, 10D:
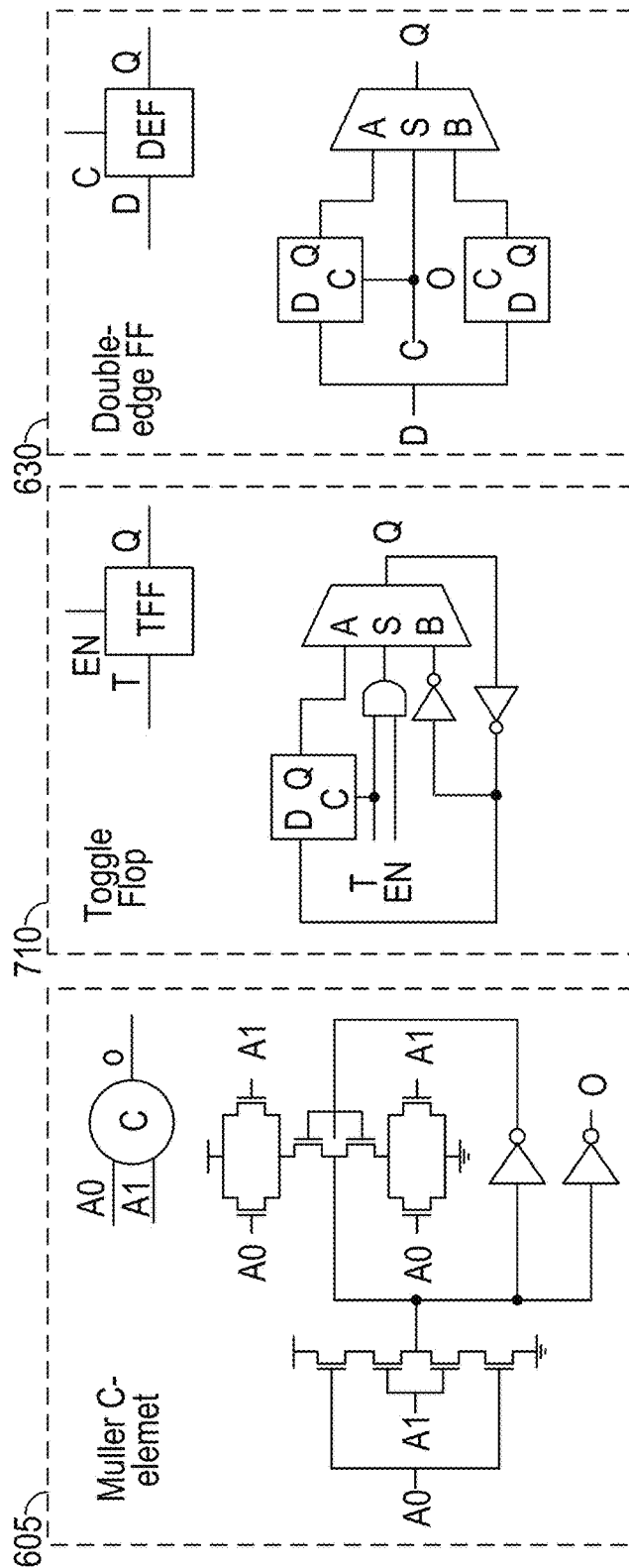

Referring now to FIG. 10A, shown is a block diagram of input and output ports of a router in accordance with one embodiment of the present invention. The router sends incoming sideband data from each In Port to the correct Out Port, in addition to handling reservation packets, and circuit-switched control and data information. In FIG. 10A, In Port 600 is shown on the left, and the Out Port 700 is on the right. First consider packet-switched portion 601/701. In the credit-2 packet system, the number of sent requests can exceed the number of received grants by 2. Requests and grants are transition encoded. In the In Port, the request is converted to a level-sensitive signal, demuxed using address information and sent to the correct Out Port. Latches and a C-element block the incoming packet when the router is busy. Beginning with the packet portion 601 of In Port 600, an incoming request is received via a C-element 605, which further receives a grant signal and which drives one input of an exclusive-OR gate 610. FIG. 10B shows a block diagram of a C-element in accordance with one embodiment of the present invention. The other input is from a grant output of exclusive-OR gate 620, which receives a plurality of grant signals. In turn, the output of gate 610 is coupled to a demultiplexer 615 and further drives latches 630 which receive incoming packet data, and address information, and a circuit enable signal. The output of gate 610 is an intermediate level-sensitive request signal, used by the router to process a request that arrives at the input port.

Information regarding a reservation packet is stored into a FIFO 650. More specifically, the information may be stored into an entry via the output of a decoder 625. In an embodiment, an address may be associated with each core (and thus router in cases where there is a 1:1 mapping between cores and routers). In turn, this address may be used to generate direction information local to each router to identify the appropriate port of the router for sending the information. In an embodiment, this direction information, which may be two bits to identify one of four directions, is stored in the FIFO.

When a given input port is open, the incoming data and address information is passed through latches 630 and through to a multiplexer 735 of Out Port 700. Note that various elements for circuit-switched communication are controlled via circuit acknowledge signals received via exclusive-OR gates 665 and 670 in turn coupled to another exclusive-OR gate 675. The tail signal indicates the end of a data transfer and is provided to XOR gate 655, demultiplexer 660, and consequently toggle flip-flop 745, and XOR gate 765. An incoming circuit stream signal is provided (via an exclusive-OR gate 680) and through a demultiplexer 690 (for the stream signal) and onto Out Port 700, and more specifically to a toggle flip-flop 750. The output of toggle flop 750 drives a double edge flip flop 760 and also is an input to an exclusive-OR gate 770, thus outputting control signals for circuit stream data. In turn, the circuit data itself is communicated through In Port 600 and through Out Port 700 via a multiplexer latch 755.

A corresponding FIFO 740 is present in Out Port 700 and is configured to receive inputs via a direction arbiter 705. Multiplexers 735 are coupled to double edge triggered flip flops 730. The direction of data flow is determined in direction arbiter 705 which in turn drives toggle flop 710 to output grant signals. Referring now to FIG. 10C, shown is a block diagram of a toggle flop in accordance with one embodiment of the present invention. Note further the presence of another C-element 725, the output of which is coupled to an input of an exclusive NOR gate 715.

Grants from Out Ports are sent upstream, back toward the source. In the Out Port, direction arbiter 705 chooses from among In Port requests. The request is converted to a transition using toggle flop 710. The transition serves both as an outgoing request and a grant for the previous router. The outgoing request flops address and data information using double-edge triggered flops. Referring now to FIG. 10D, shown is a block diagram of a double-edge triggered flop in accordance with one embodiment of the present invention. A C-element keeps track of the credit, and disables the toggle flop if the credit is exceeded.

The packet is thus used to establish a circuit-switched channel using the circuit portion 602/702 of FIG. 10A. The packet stores direction information into the highest available FIFO slot in all ports. The highest overall priority FIFO slot controls demuxes and muxes for the circuit-switched control signals and data. A latch is used for circuit data only to prevent unnecessary glitches on the data link. In an embodiment, the latch remains open during a circuit transfer and switches only once per stream, for significantly lower clock power than packet switching. In an embodiment, two forward control signals are implemented (Stream and Tail) that both designate a data transfer. The Stream signal indicates communication of circuit data with more data to follow (as additional segments) and thus keeps the circuit channel open for a complete circuit data transfer (of one or more segments), and the Tail signal indicates an end of a circuit data transfer, and de-allocates the circuit-switched channel by incrementing the FIFO priorities. In turn, in the opposite direction, a reverse control signal (Acknowledge) is sent from destination to source for each segment of the circuit data transfer.

Figure 11:
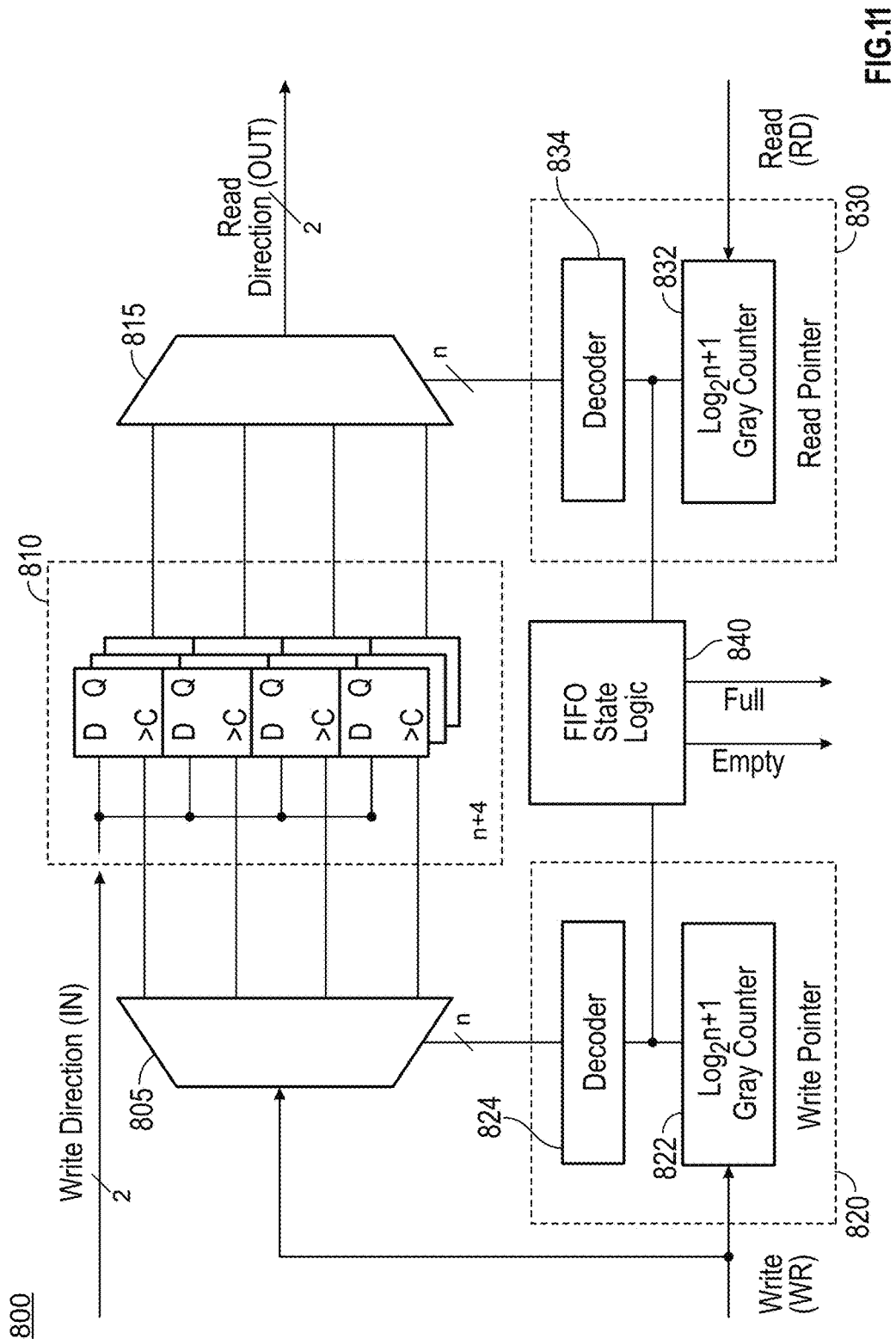
FIG. 11 is a block diagram of a first-in first-out (FIFO) buffer in accordance with an embodiment of the present invention.

Referring now to FIG. 11, shown is a block diagram of a FIFO 800 in accordance with an embodiment of the present invention. FIFO 800 is implemented as a 4-deep register with rotating write and read pointers, in an embodiment. As seen in FIG. 11, a FIFO bank 810 receives incoming write data into a corresponding one of its entries via a demultiplexer 805 controlled by a write pointer 820 that in turn includes a Gray counter 822 and a decoder 824. Decoding is performed in the FIFO in such a way as to prevent all glitches. In the embodiment, the FIFO pointers are Gray encoded, and the FIFO operates as a circular FIFO to ensure that there is no glitching. This encoding also enables a comparison between read and write pointers without any glitches to determine if the FIFO is full or empty.

The entries of FIFO bank 810 are coupled to an output multiplexer 815, which outputs a selected entry to be read via a read pointer 830 controlled by a Gray counter 832 and a decoder 834. Note further the presence of a FIFO state logic 840 used to provide Empty and Full signals.

FIFO 800 is thus configured as the interface between packet-switched reservations and circuit-switched transfers. The pointers are implemented as Gray counters to allow glitch-free asynchronous write and read operations. Since reservations for circuit transfers may be queued, the reservation packets propagate faster than the circuit-switched transfer and sets up the downstream circuit-switched channel ahead of time to hide address decoding and direction arbitration latencies.

Dimension order routing (X-first then-Y) prevents deadlock in packet networks. With circuit transfers, an additional deadlock scenario may occur when packets allocate a circuit-switched channel, but the circuit transfers form a cyclical priority loop and never arrive. Embodiments may avoid this deadlock scenario by stalling requests only at turns until the circuit control signal arrives. A turn occurs when the request and circuit transfer change direction from E or W, to N or S. A similar situation can occur with a turn from any cardinal direction down to the core port. In this scenario, transfer order does not need to be maintained since the downstream port is the final destination, and the earliest arriving circuit transfer is selected. Thus using an embodiment of the present invention, deadlocks are avoided by stalling requests at turns (E,W->N,S) until a valid circuit transfer arrives.

Figure 12:
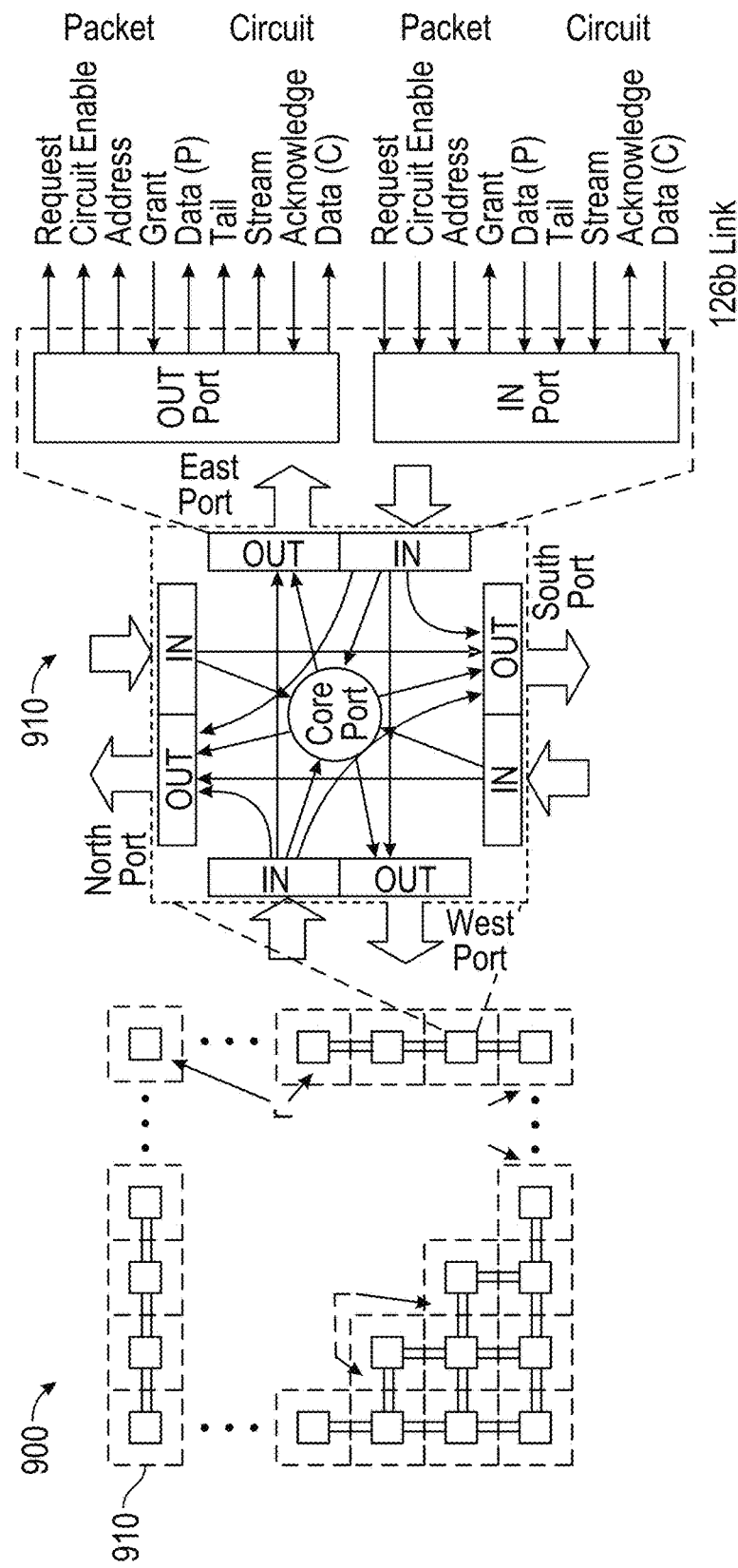
FIG. 12 is a block diagram of an example NoC in accordance with an embodiment of the present invention.

A router implementation as described herein can be used in many different types of systems. Referring now to FIG. 12, shown is a block diagram of a NoC 900 implemented in a 16×16 mesh. In an embodiment, each router 910 has a unique clock and voltage. In an embodiment, the links between routers may be implemented with a 126b wide interconnect including 32b packet data and 80b circuit-switched data. Understand however that a NoC in accordance with an embodiment of the present invention may be applied to many network topologies, sizes, bus widths, and processes.

As seen in FIG. 12, NoC 900 includes a plurality of individual routers 910. Each such router includes 5 ports, namely east, west, north, south ports and a core port. Each port is formed of an in port and an out port. The various circuit and packet signals associated with the corresponding in port and out port are also shown in FIG. 12. Note that between these 5 ports, various crossbar and arbitration logic may be provided. In an embodiment, the E and W directional links may be adapted on one metal layer, the N and S directional links on a second metal layer, and the core links adapted on a third metal layer. Each of the routers sends 112b data (including 32b packet and 80b circuit-switched data). In a particular embodiment, the NoC may be designed to achieve a bisection bandwidth of 10.3 Tb/s and having an energy-efficiency of 369 Gb/s/W with random saturated traffic.

Source synchronous operation provides a throughput improvement by not worst-casing the cycle time. For the same energy efficiency, an example source-synchronous packet-switched NoC may have approximately 26% higher throughput than a fully synchronous design, and an approximately 47% higher energy-efficiency at the same throughput.

Using streaming data transfers, more circuit-switched data is sent as a result of each request packet. Packet latency and power overheads are spread out over a greater number of circuit transfers, increasing throughput and energy efficiency. Circuit-switching in a source-synchronous context eliminates clocking and flop power for intra-route storage, increasing energy-efficiency over packet-switched data in an NoC.

Using an embodiment of the present invention, an NoC facilitates the incorporation of multiple clocking domains into the NoC with high energy efficiency. Source synchronous operation mitigates global clock distribution and synchronizing data FIFO power. Cycle time may be decreased by not margining for the worst case, and margins for clock skew and jitter may be removed. Circuit-switched transfers further decrease clock power by removing wide flop arrays from the data path. These transfers are not margined for worst-case corner-to-corner latencies because of source-synchronous operation. Source-synchronous hybrid packet and circuit-switched NoCs allow cores with differing clock domains to communicate with higher energy efficiency. This facilitates the integration of heterogeneous NoCs, with different IPs in different clock domains. The methodology also increases resiliency to process variation, by mitigating the timing uncertainty associated with critical paths as well as clock skew and jitter.

Without the need for a global clock, different IPs can run at independent frequencies and supply voltages. This may be particularly beneficial for SoC designs, where different components can be operated at their own energy optimal point and seamlessly be incorporated with the NoC without taking any delay or energy penalty for synchronization circuits except at the core/network interface. In addition, the source synchronous nature of communication between routers improves packet latency for congested traffic, also resulting in better than worst case packet latency in a heterogeneous system.

One example of such fabric is a 256 node fabric connected in a 4-level hierarchical star topology. Interconnect length doubles with increasing hierarchy because routers are spaced further apart from each other. Considering a case in which 50% of the packets entering every hierarchy are directed towards routers at the higher hierarchy, traffic at higher levels is more congested. In such a scenario, operating lower hierarchy routers at reduced supply voltages provides higher energy efficiency with negligible loss in throughput. This is seamlessly accomplished without any additional logic overhead, given the ability to operate at independent supply voltages.

In one implementation, packet-switched router circuits use control flow signal transitions instead of a clock to send packets. In this system, an input port receives incoming packets, determines direction, and forwards the packets to an appropriate output port. In turn, an output port chooses from among available packets to send one to the next router. A router receives a packet indicated by a request signal transition and transitions a grant signal back to indicate readiness for another packet. In some embodiments, a credit-2 credit communication protocol sending two packets before receiving a grant. When a latch is closed at the input port of the router, subsequent packets are blocked during the processing of a first packet.

In one implementation, a double edge flip-flop is used in the output port to send data to the next router, a C-element is used to track request and acknowledge signals within the input port, a C-element is used to track credit within the output port and disable sending further packets when credit is exhausted. Glitch-free address decoding circuits may be used to forward a request signal to the appropriate output port, and direction arbitration circuits select one request from among input port request signals based on arrival order to send to enter the output port while avoiding starvation. And, with additional credit tracking and storage circuits, a multiple-credit system is enabled.

Embodiments further provide hybrid circuit-switched router circuits that use control flow signal transitions instead of a clock to send circuit-switched data. In an embodiment, request packets are sent to create a circuit-switched path. FIFO request storage within each router stores request packet directions as request packets traverse the router. Global priority ordering may be maintained across an NoC by writing requests to an available entry with highest priority. In this way, the highest priority request from a filled FIFO entry configures a circuit-switched channel. For the circuit-switched portion of the circuits, a circuit-switched stream signal indicates arrival of circuit-switched data with more transfers to follow, a circuit-switched valid signal indicates arrival of circuit-switched data to complete a transfer, and a circuit-switched acknowledge signal indicates circuit-switched data was received at its destination. Note that packets may be used for small sideband transfers in addition to circuit-switched transfers, and signals may be used to indicate whether a packet is used for sideband data, circuit-switched path setup, or both.

Figure 13:
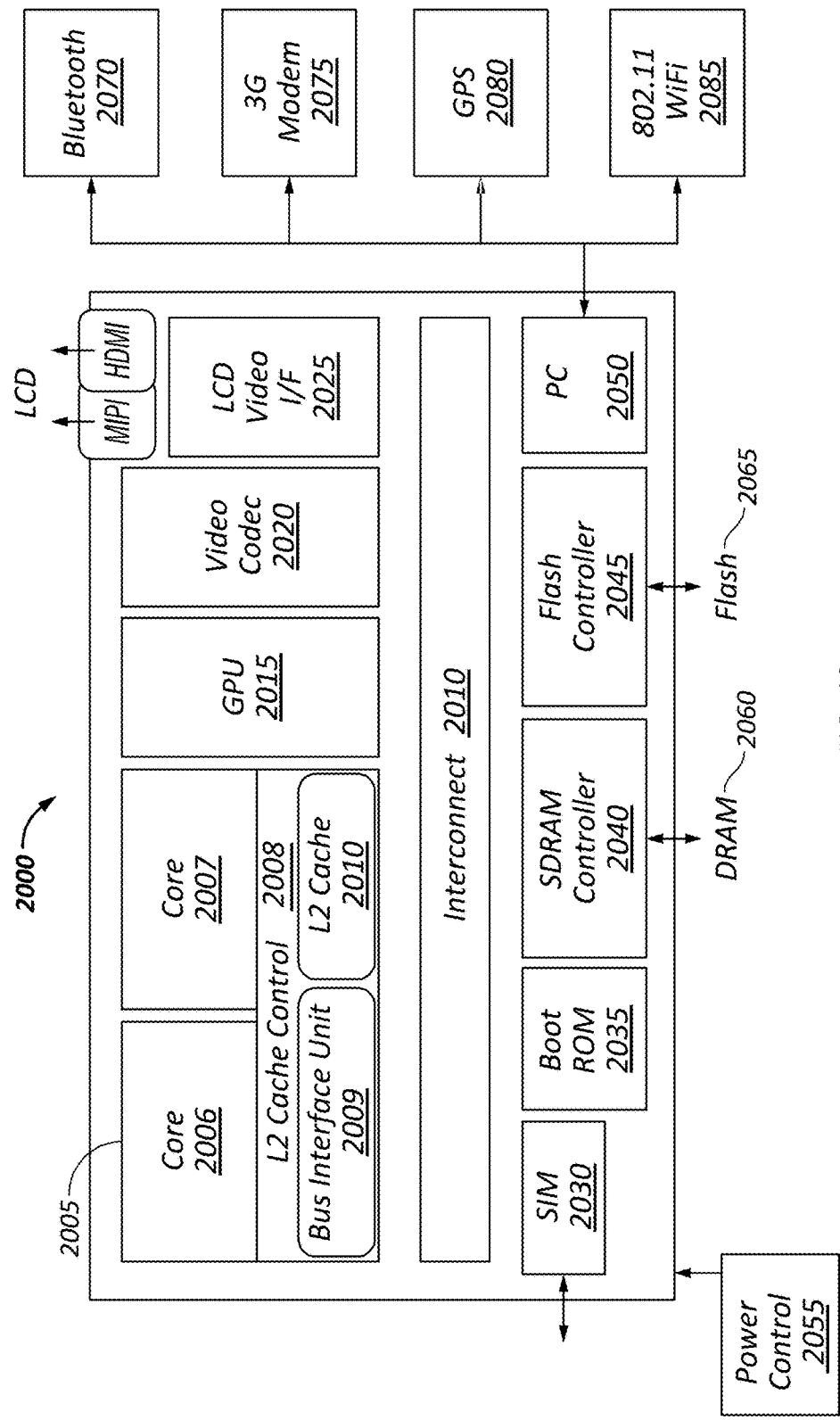
FIG. 13 is a block diagram of an embodiment of a system on-chip (SOC) design in accordance with an embodiment of the present invention.

Turning next to FIG. 13, an embodiment of a system on-chip (SOC) design in accordance with an embodiment is depicted. As a specific illustrative example, SOC Q2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect, such as an IOSF, AM BA, or other interconnect discussed above, which potentially implements one or more aspects of the described herein.

Interconnect 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055. Note as stated above, a UE includes a radio for communication. As a result, these peripheral communication modules are not all required. However, in a UE some form a radio for external communication is to be included.

The following examples pertain to further embodiments.

In one example, an apparatus comprises a router including a first input port and a first output port, wherein the router is of a NoC, the router to enable communication of a packet from the router to a second router of the NoC based on transitions in control flow signals.

In an example, the first input port includes a latch to receive communication of a request from the second router, responsive to a transition in a first control flow signal received in the first input port.

In an example, the first input port is to send a second control flow signal to the second router responsive to servicing of the request to indicate readiness for servicing of another request, and to open the latch.

In an example, the second router is to communicate a plurality of packets to the router before receipt of the transition in the second control flow signal, where a credit level of the second router is updated based on the transition in the second control flow signal.

In an example, when closed, the latch is to prevent insertion of a new packet into the first input port during processing of the request.

In an example, the first input port is to receive a packet associated with the transition in the first flow control signal and to transition the second flow control signal to indicate readiness for receipt of another packet.

In an example, the apparatus further comprises a buffer coupled between the router and the second router to store at least one of the plurality of packets before communication to the router.

In an example, the router comprises a credit logic to receive a first control flow signal and a second control flow signal, and to generate a third signal based on the first and second control flow signals, and to update a credit level based on the first and second control flow signals and the third signal.

In an example, the third signal is a first value responsive to a transition in the first control flow signal and a second value responsive to a transition in the second control flow signal.

In an example, the credit logic is to enable the second router to communicate the request before receipt of a first transition in the second control flow signal, and to prevent the second router from communication of the request when the credit level is less than a threshold.

In an example, the NoC is a source-synchronous hybrid packet/circuit-switched NoC.

In an example, the router is to operate at a first frequency and a first voltage, and the second router is to operate at a second frequency and a second voltage.

In one example, an apparatus comprises a plurality of routers each having a set of input ports and a set of output ports, each of the input ports and the output ports having a circuit-switched portion and a packet-switched portion, where the packet-switched portion of a plurality of the sets of input ports and output ports between a source logic and a destination logic are to establish a circuit-switched channel between the source logic and the destination logic to communicate circuit-switched data based on control flow signal transitions, where the plurality of routers operate according to a source-synchronous protocol.

In an example, each of the packet-switched portions includes a buffer to store requests, where a priority of the requests is variable at each of the packet-switched portions.

In an example, the buffer includes a plurality of entries each to store direction information associated with one of the requests, and where global priority ordering is maintained by storage of a first priority request in an available entry of the buffer having a highest priority.

In an example, the apparatus further comprises a first selector coupled to an input of the buffer, and a write pointer logic to control the first selector, where the write pointer logic includes a Gray counter to select an entry of the buffer in which to write the direction information, a second selector coupled to an output of the buffer, and a read pointer logic to control the first selector, where the read pointer logic includes a Gray counter to select an entry of the buffer from which to read the direction information.

In an example, when a first request has a highest priority in each of the packet-switched portions between the source logic and the destination logic, the circuit-switched channel is established for communication of data associated with the first request.

In an example, the circuit-switched channel is to communicate a plurality of data segments of a circuit-switched data communication responsive to establishment of the circuit-switched channel.

In an example, the circuit-switched channel is to communicate a first circuit control flow signal to indicate arrival of a first data segment of the plurality of data segments with at least one additional data segment to follow, a second circuit control flow signal to indicate completion of the circuit-switched data communication, and a third circuit control flow signal to indicate receipt of each data segment of the plurality of data packets in the source logic.

In an example, each of the plurality of routers is associated with a core of a SoC.

In an example, the packet-switched portion is to communicate sideband data as a first packet.

In an example, the packet-switched portion is to communicate a reservation request for establishment of the circuit-switched channel as a second packet.

In one example, a method comprises determining, in a packet portion of a NoC, that a reservation request issued from a source logic to a destination logic has a highest priority among a plurality of reservation requests stored in buffers of a plurality of routers coupled between the source logic and the destination logic, and establishing, in a circuit portion of the NoC, a circuit-switched channel between the source logic and the destination logic, to enable data communication between the source logic and the destination logic.

In an example, the NoC is a source-synchronous hybrid packet/circuit-switched NoC.

In an example, the method further comprises responsive to receipt of a first packet of the data communication in the destination logic, initiating a transition in a first acknowledgement signal to be communicated to the source logic.

In an example, the method further comprises updating a credit value in the source logic responsive to receipt of the transition in the first acknowledgement signal.

In an example, the method further comprises enabling the source logic to communicate a plurality of packets to the destination logic before receipt of the transition in the first acknowledgment signal.

In one example, an apparatus comprises means to perform a method as claims in any one of any one or more of the above examples.

In another example, a machine-readable storage medium includes machine-readable instructions, when executed, to implement a method as claimed in any one of any one or more of the above examples.

In one example, a system comprises a SoC including a plurality of cores each associated with a router of a source-synchronous NoC, each of the routers comprising a set of input ports and a set of output ports, each of the input ports and the output ports having a circuit-switched portion and a packet-switched portion, where the packet-switched portions between a source core and a destination core are to establish a circuit-switched channel for communication of circuit-switched data based on control flow signal transitions, and a non-volatile storage coupled to the SoC.

In an example, a first packet-switched portion is to generate a transition in a first packet control flow signal to indicate transmission of a packet from the first packet-switched portion to a second packet-switched portion, and the second packet-switched portion is to generate a transition in a second packet control flow signal to indicate readiness for receipt of another packet.

In an example, a first circuit-switched portion is to generate a transition in a first circuit control flow signal to indicate arrival of a first data segment of the circuit-switched data, and to generate a transition in a second circuit control flow signal to indicate completion of communication of the circuit-switched data.

In an example, the processor comprises a SoC is incorporated in a user equipment touch-enabled device.

In another example, a system comprises a display and a memory, and includes the processor of one or more of the above examples.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a plurality of routers each having a set of input ports and a set of output ports, each of the input ports and the output ports having a circuit-switched portion and a packet-switched portion, wherein the packet-switched portion of a plurality of the sets of input ports and output ports between a source logic and a destination logic are to establish a circuit-switched channel between the source logic and the destination logic to communicate circuit-switched data based on control flow signal transitions, wherein the plurality of routers operate according to a source-synchronous protocol, and each of the packet-switched portions includes:
  a buffer to store requests, wherein a priority of the requests is variable at each of the packet-switched portions, the buffer including a plurality of entries each to store direction information associated with one of the requests, and wherein global priority ordering is maintained by storage of a first priority request in an available entry of the buffer having a highest priority;

a first selector coupled to an input of the buffer;

a write pointer logic to control the first selector, wherein the write pointer logic includes a Gray counter to select an entry of the buffer in which to write the direction information;

a second selector coupled to an output of the buffer; and a read pointer logic to control the first selector, wherein the read pointer logic includes a Gray counter to select an entry of the buffer from which to read the direction information.

2. The apparatus of claim 1, wherein when a first request has a highest priority in each of the packet-switched portions between the source logic and the destination logic, the circuit-switched channel is established for communication of data associated with the first request.

3. The apparatus of claim 2, wherein the circuit-switched channel is to communicate a plurality of data segments of a circuit-switched data communication responsive to establishment of the circuit-switched channel.

4. The apparatus of claim 3, wherein the circuit-switched channel is to communicate a first circuit control flow signal to indicate arrival of a first data segment of the plurality of data segments with at least one additional data segment to follow, a second circuit control flow signal to indicate completion of the circuit-switched data communication, and a third circuit control flow signal to indicate receipt of each data segment of the plurality of data packets in the source logic.

5. The apparatus of claim 1, wherein each of the plurality of routers is associated with a core of a system on a chip (SoC).

6. The apparatus of claim 1, wherein the packet-switched portion is to communicate sideband data as a first packet.

7. The apparatus of claim 6, wherein the packet-switched portion is to communicate a reservation request for establishment of the circuit-switched channel as a second packet.

* * * * *